No. 704,990. Patented July 15, 1902.
LA FAYETTE D. VORCE.
APPARATUS FOR SEPARATING SOLVENTS FROM OILS.
(Application filed Oct. 31, 1900.)
(No Model.) 2 Sheets—Sheet 2.
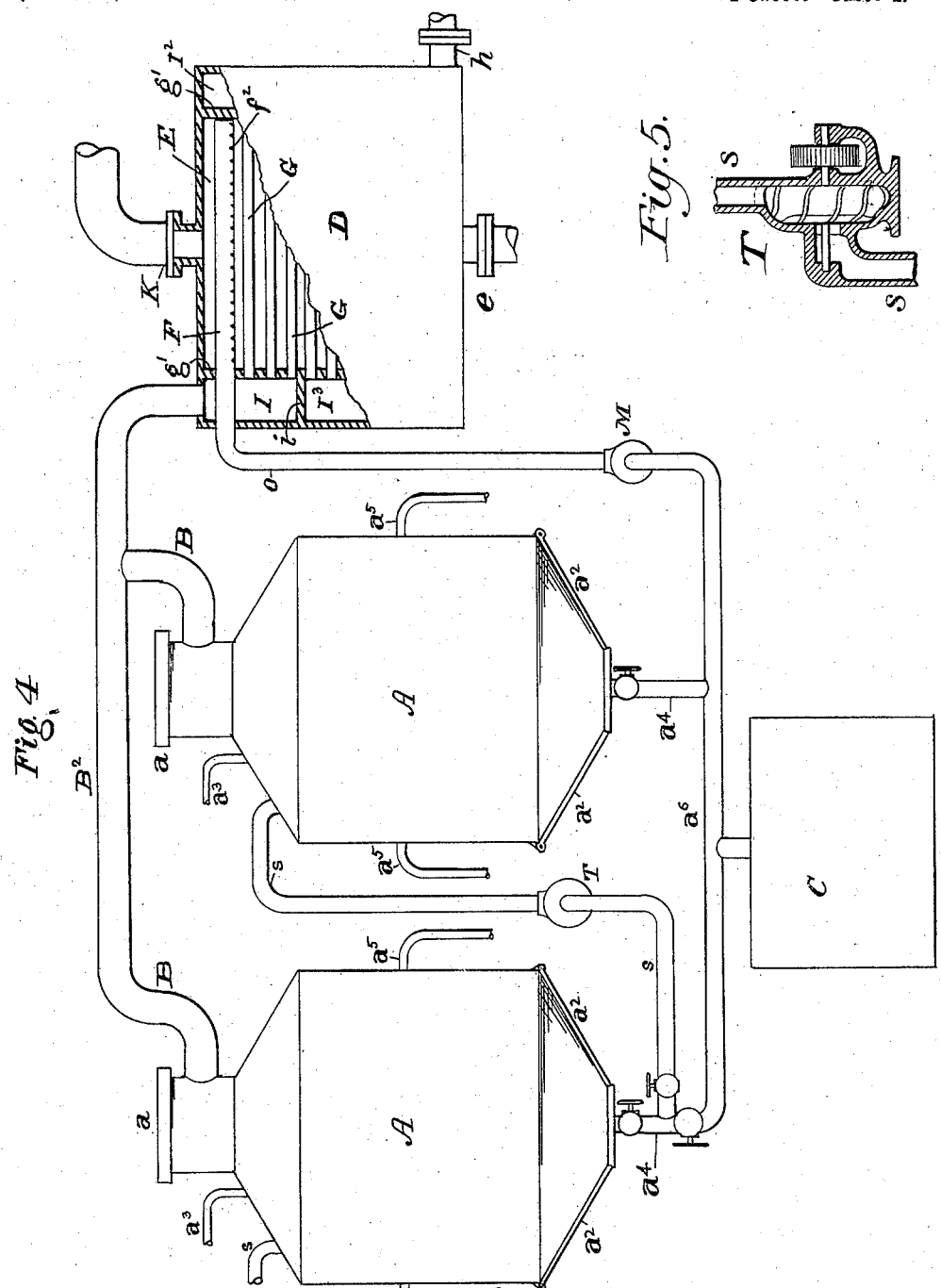
WITNESSES:
INVENTOR.
La Fayette Denton Vorce
BY 
his ATTORNEY.

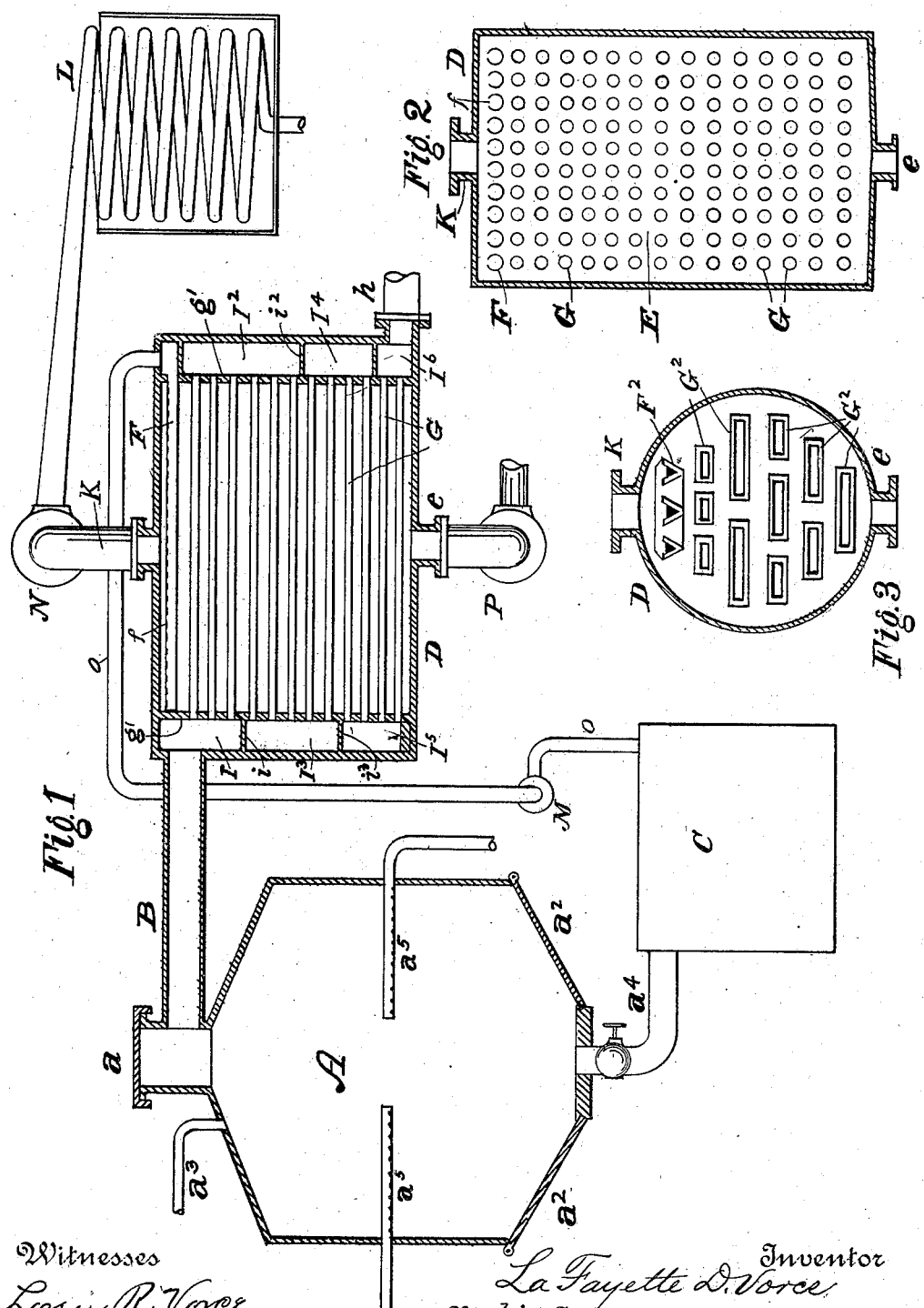

UNITED STATES PATENT OFFICE.

LA FAYETTE DENTON VORCE, OF CHICAGO, ILLINOIS.

APPARATUS FOR SEPARATING SOLVENT FROM OILS.

SPECIFICATION forming part of Letters Patent No. 704,990, dated July 15, 1902

Application filed October 31, 1900. Serial No. 35,007. (No model.)

*To all whom it may concern:*

Be it known that I, LA FAYETTE DENTON VORCE, a citizen of the United States, residing at Chicago, in the county of Cook and State of Illinois, have invented certain new and useful Improvements in Apparatus for the Separation of Solvent from Oils, &c.; and I do hereby declare the following to be a full, clear, and exact description of the invention, such as will enable others skilled in the art to which it appertains to make and use the same.

My invention relates to apparatus for the separation of the solvent from the oil or other extracted matter obtained by the process of extracting oils and other extractive matters from seeds and other substances by the use of solvents.

The object of the invention is to increase the economy and efficiency of the process heretofore in use; and it consists in the novel construction and combination of parts, as hereinafter fully described, and specifically set forth in the claims.

In the process in use for separating the solvent from oils, &c., obtained by the use of solvents prior to my invention after the oil or other extractive matter has been extracted from the oil-bearing substances or other material and the solution containing the same drawn off the excess of solvent is drawn from the percolator, and to remove the residual solvent mechanically held by the percolated mass steam is forced into the containing-chamber, whereby the solvent is vaporized and, together with the steam, carried from the percolator through a suitable vapor-pipe terminating in a condenser, in which the steam and solvent are condensed, the latent heat of both steam and solvent being taken up by water circulating around the condensing-pipes. The recovery of the oil or other extracted matter from the solvent, so as to reclaim the latter for use over again, has been effected by subjecting the solution to distillation by the use of steam heat in various forms of apparatus at a subsequent time.

In the above-described operation of steaming out the residual solvent from exhausted material in the percolator and recovering the solvent thus driven out by condensation a very large amount of heat has been lost, as the steaming out has to be continued for a considerable time—often several hours—and a very large amount of highly-heated steam has to be used to secure the complete elimination of all traces of the solvent from the exhausted material, which is essential.

The purpose of my invention is to provide apparatus whereby the great loss and waste of heat which has hitherto been suffered may be avoided and the heat heretofore wasted most efficiently utilized in effecting, either wholly or partially, the separation of the solvent from the extracted oil or other matter.

In the drawings hereto annexed is shown a form of apparatus which I have found especially effective for that purpose.

Figure 1 is a vertical longitudinal section showing the arrangement of the percolator and the separator. Fig. 2 is a vertical transverse section through the separator, showing the preferred arrangement of pipes. Fig. 3 is a modified form of separator shown in central vertical section. Fig. 4 is a view in elevation and partial section, exhibiting the manner in which the percolators may be run in series. Fig. 5 is a detail showing more fully the construction of the pumps M, T, P, and N, which, as shown, are all of the same construction, but may be any preferred form of pump.

In the extraction of oil and other materials by the solvent process as heretofore conducted the extraction-tank or percolator has been sometimes operated independently, and in other cases a number of such percolators have been so connected as to be operated in series, the first charge of solvent from each percolator being the richest in extracted matter being drawn off to a storage-tank C, while the subsequent successive charges of solvent have been conducted from each percolator to another one in the series containing matter less completely exhausted. My improved separator is intended to be used in combination with the percolating apparatus, whether the latter be used individually or in series.

In the drawings the percolator shown in Fig. 1 is intended to represent either one percolator or a series of them, according to whichever method of extraction is employed. In Fig. 4 the connection of two percolators in series is shown, from which the connection of any number of percolators in series will be understood.

A represents a percolator or macerator (or a series of them) of any suitable construction, in which the action of the solvent upon the material is carried on by any of the well-known methods, and which percolator is commonly provided with a manhole having tight cover $a$, with one or more doors $a^2$ for discharging the spent material, with a solvent-inlet pipe $a^3$, with an eduction-pipe $a^4$ for conducting away the solution containing the extracted matters, and with any suitable or preferred steam-inlet pipes, as $a^5$, for intromitting steam into the mass of exhausted material in the percolator.

B represents a vapor-offtake pipe, through which the steam and vaporized solvent pass from the percolator A to the separating apparatus D.

When the percolators are used in series, the vapor-pipes B may be connected to a vapor-main $B^2$, as shown in Fig. 4, and the eduction-pipes $a^4$ may in like manner communicate with a main $a^6$, as shown in Fig. 4, and pipe $s$, connecting with the pump T, connects the bottom of one percolator with the top of another, so that after drawing off the first charge of solvent and oil the subsequent charges of solvent may be pumped from one percolator directly into the next in series and there used for the first extraction instead of using fresh solvent.

The separating apparatus comprises, essentially, a closed chamber, into the upper part of which the solution of solvent and oil or other extracted matter is conveyed and there caused to fall in a spray or thin film or stream downward over closed pipes or hollow shelves, through which the hot vapors and steam drawn off from the percolator in the steaming-out process are conducted, by which means the latent heat of the steam and vapors is taken up by the solution in contact with the exterior of said pipes or hollow shelves, and thereby the volatilization of the solvent from the solution and the condensation of the steam and vapors in the closed pipes or shelves are simultaneously effected. By this means I effect not only a great saving of heat, but also a great saving of time, and I very materially increase the efficiency of the entire apparatus. It will thus be apparent that in the separator D are combined in substantial effect two separate devices, which in the prior state of the art were used independently of each other. These are the still, which formerly was used for driving off the solvent from the solution by heat, and which has been known in the art as a "separator," and also the condenser, which has heretofore been used for condensing the vapors of steam and solvent coming from the percolator and enabling the solvent condensed from such vapors to be again used. Although, as before stated, the particular forms of such condenser and separator heretofore used have been varied, the general arrangement and connection in which they have been used are shown in the patent to H. T. Yaryan, No. 205,515, dated July 2, 1878, wherein it will be seen that the condenser for the vapors of solvent from the percolator and the separator for the oil solution were distinct and separate apparatus, not acting jointly, and, indeed, not necessarily concurrently, and this has been the method pursued whatever apparatus was used prior to my invention. An important feature of my invention therefore consists in the simultaneous separation of the solvent from the solution and condensation of the vapors from the percolator in one and the same apparatus.

D represents the separator, which in the preferred form shown in Figs. 1 and 2 comprises the closed chamber E, provided at the top with a number of horizontally-disposed spraying-pipes F, which are perforated on their upper side with perforations $f$ or may be slotted for their entire length, these pipes, which constitute, in effect, narrow troughs, being intended to be kept continually full of the solution, which is supplied to them by a pump, as M, by gravity or in any other manner, so that the solution overflowing through the perforations or open upper side of the pipes F shall drip down upon a vertical series of horizontally-disposed pipes G, through which the hot steam and vapors are passed, and which are thus constantly covered by a thin film or layer of the solution, which becomes less and less diluted as it nears the bottom of the chamber E, until finally, if the series of pipes G be numerous enough and the solution not originally too diluted, the solvent contained in the solution will be completely evaporated by the time the bottom of chamber E is reached, and the oil or other extracted matter will flow from the outlet $e$ entirely free from solvent and the completely-condensed water and solvent from the steam and vapors, passing through the pipes G, will flow from the outlet $h$. Usually, however, the amount of solution to be treated is so great that the heat of the steam and vapors from the percolators will not be sufficient to completely vaporize the solvent in the chamber E. In this case the material flowing from the outlet $e$ will be a rich solution of the extracted matter with but a small percentage of solvent. This rich solution is in such case conducted to a similar (or it may be the same) separator and there subjected to the heat of fresh steam, which completes the volatilization of the solvent. By this means I am enabled to use the separator D either as a simple separator or as a combined separator and condenser or alternately as one or the other, as may be preferred. The perforations in the solution-pipes F may be on the under side of the pipes, as shown at $f^2$ in Fig. 4, so as to discharge the solution of oil and solvent directly downward on the pipes G; but I prefer the arrangements shown in Fig. 1.

In order to obtain the most effective utilization of the heat contained in the steam and vapors from the percolator, it is necessary to pass them back and forth a number of times. The manner in which I prefer to accomplish this is shown in Fig. 1, wherein instead of numerous returning-bends in the pipes G the separator is provided with a partition $g'$ near each end, forming chambers I $I^2$, &c., into which the pipes G open at each end, the chambers I $I^2$ $I^3$, &c., thus serving as headers or mains from which the hot steam and vapors are distributed through the pipes G, and by providing partitions $i$ $i^2$ $i^3$, &c., at suitable places the direction of the flow of the steam and vapors through the pipes G is reversed as often as found necessary, thus to a certain extent interrupting or checking the direct passage of the vapors, causing eddies in the chambers I, &c., whereby the contained heat of the steam and vapors is caused to be more readily given up to the pipes G, which by preference I construct of copper or other material of high heat conductivity, and thereby the most efficient action of the apparatus is obtained.

The vaporized volatile solvent rising from the chamber E escapes through the outlet K to a condenser, as L, its passage through which may, if desired, be assisted by a vacuum-pump, as N. The oil or other extracted matter freed wholly or in part from the solvent flows from the bottom of the chamber through the outlet $e$ by gravity in case no vacuum-pump is used for the eduction of the volatilized solvent or by the assistance of a suction-pump, as P, in case a vacuum-pump is used for drawing off the vapors of the volatilized solvent.

The steam and vapors of solvent, which become wholly or partly condensed in passing through the pipes G, escape from the last chamber $I^6$ and are conducted either to an ordinary separator, in which the water and condensed solvent are separated by gravity in the usual way, or if not wholly condensed are conducted to an auxiliary condenser and the condensation therein completed. The percolators and other apparatus aside from the separator may be such as are already in extensive use in the extraction of oil and other substances by the solvent process. It is of course to be understood that the location of the separator with reference to the percolator may be different from that shown in the drawings; but to avoid the loss of heat in the steam and vapors from the percolator I prefer to locate the separator as near as convenient to the percolators.

The arrangement of piping may of course be varied, and valves may be provided in any of the pipes in any desired points.

In the form of separator shown in Fig. 3 I have illustrated the use of flat hollow shelves in place of the pipes G, for which they are, however, merely an equivalent.

The process hereinabove described is not claimed in this application, as it forms the subject-matter of my pending application, No. 34,688, filed October 29, 1900.

Having fully described my invention, what I claim as new, and desire to secure by Letters Patent, is—

1. In an oil-extracting apparatus a percolating-tank and an oil and solvent tank open thereto, in combination with a separator connected with the top of said percolator, means to penetrate the percolator with steam to vaporize off the solvent to said separator, and a pump and connections between said oil and solvent tank and the separator.

2. In apparatus for the extraction of soluble matters by the aid of solvents the combination with the percolators in which the extraction is conducted of a separator through which the steam and vaporized solvent from the percolators are passed, a spraying apparatus to which the solution of solvent and extracted matter from the percolators is conducted and by which the solution is caused to drip upon the condenser-coils, means for introducing the vapors from the percolator into the heating-tubes of the separator, and means for collecting the extracted matter and the volatilized solvent separately.

3. In apparatus for the extraction of oil, &c., by the aid of a solvent the combination with the percolators in which the extraction is conducted of a separator comprising a closed chamber having therein pipes through which the steam and vaporized solvent from the percolators are passed and a spraying device above said pipes to which the solution of oil and solvent from the percolators is conducted, means for introducing the vapors from the percolator into the heating-pipes of the separator, and means for collecting the extracted matter and the solvent separately, substantially as specified.

4. In apparatus for the extraction of oil, &c., by the aid of a solvent the combination with the percolator having steam-intromitting pipes, of a separator comprising a closed chamber having at the top a spraying device and beneath the same a series of separated pipes extending completely through the chamber, a connection from the top of the percolator to said pipes, a pipe for supplying the solution of extracted matter to said spraying device, separate outlets from said chamber for the extracted matter and the vaporized solvent, and means for collecting the condensed steam and solvent from said pipes, substantially as described.

5. In apparatus for the extraction of oil, &c., by aid of a solvent the combination with the percolators having steam-intromitting pipes of a separator comprising a closed chamber having at the top a spraying device and beneath the same a series of separated pipes extending completely through the chamber and opening into chambers which communicate with part only of said pipes, a connection from the top of the percolator to said pipes, a pipe for supplying the solution of extracted matter to said spraying device, separate outlets from said chamber for the extracted matter and the vaporized solvent, and means for collecting the condensed steam and solvent from said pipes, substantially as described.

6. In oil-extracting apparatus, a separator having a separated internal chamber and flues separated from each other leading therethrough and open at both ends into a space within the outer walls of the separator, and two sets of inlets and outlets to the separator, in combination with a percolator having steam-intromitting pipes, a vapor connection therefrom to one of the end spaces, and a connection from the inlet of the internal chamber to the supply of oil solution, substantially as described.

7. In oil-extracting apparatus, a separator having inlet and outlet openings, and an interior chamber with its own outlet and inlet openings, pipe connections to all said openings, a set of open-ended flues traversing the interior chamber and not connected together, a fluid-discharge pipe entering said interior chamber over said flues and connecting with the oil-solution supply, a percolator having steam-intromitting pipes, and a vapor-pipe connecting said separator with the percolator, substantially as described.

8. In an oil-extracting apparatus, a combined separator and condenser having an interior chamber with inlets and outlets through the walls thereof, a series of separate open-ended condenser-pipes extending through said interior chamber and open at both ends into a space within the outer walls of the separator, in combination with a percolator having steam-intromitting pipes, a vapor-pipe from said percolator to one of said end chambers of the separator, a receiving-tank, a pipe therefrom communicating with said interior chamber over the tubes therein, a pump in said pipe, and an outlet from one of said end chambers for the contents of said condenser-pipes, substantially as described.

9. The combined separator and condenser, comprising a central chamber having at its top a spraying device and at each end partitioned chambers inclosed within the outer shell, open-ended condenser-pipes separate from each other and extending through said central chamber into the end chambers, outlets at top and bottom of said central chamber, a vapor-inlet to one of said end chambers and a liquid-outlet from another, in combination with a percolator having steam-intromitting pipes, a vapor-pipe from said percolator to the vapor-inlet of the separator, a combined solvent and oil tank, a pipe from said tank to said spraying device, and a pump in said pipe, substantially as described.

In testimony whereof I hereto affix my signature in presence of two witnesses.

LA FAYETTE DENTON VORCE.

Witnesses:
JNO. T. DE MILLE,
WILLIAM IRWIN.